United States Patent
Tjoelker et al.

(10) Patent No.: US 6,409,239 B1
(45) Date of Patent: Jun. 25, 2002

(54) ENERGY ABSORPTION IMPACT SYSTEM AND METHOD FOR MAKING THE SAME

(75) Inventors: Todd W. J. Tjoelker; Tyler Steven Hernden, both of Grand Rapids; Craig A. Fellows, Pierson; Davon M. Browne, Hudsonville, all of MI (US)

(73) Assignee: Benteler Automotive Corporation, Grand Rapids, MI (US)

( * ) Notice: Subject to any disclaimer, the term of this patent is extended or adjusted under 35 U.S.C. 154(b) by 0 days.

(21) Appl. No.: 09/836,008

(22) Filed: Apr. 17, 2001

(51) Int. Cl.$^7$ .............................................. B60R 19/34
(52) U.S. Cl. ........................ 293/133; 293/132; 296/189; 188/376
(58) Field of Search ................................ 293/133, 132; 280/784; 296/189; 188/377

(56) References Cited

U.S. PATENT DOCUMENTS

| | | | |
|---|---|---|---|
| 3,412,628 A | 11/1968 | De Gain | |
| 3,779,591 A | * 12/1973 | Rands ........................ | 293/133 |
| 3,782,769 A | 1/1974 | Fader et al. | |
| 3,912,295 A | * 10/1975 | Eggert, Jr. .................. | 293/133 |
| 4,190,276 A | * 2/1980 | Hirano et al. ................ | 293/133 |
| 4,272,114 A | * 6/1981 | Hirano et al. ................ | 293/133 |
| 4,411,167 A | 10/1983 | Mohr | |
| 4,545,236 A | 10/1985 | Turczyn | |
| 4,702,515 A | 10/1987 | Kato et al. | |
| 4,829,979 A | * 5/1989 | Moir .......................... | 293/133 |
| 4,976,481 A | 12/1990 | Yoshihira | |
| 5,085,467 A | 2/1992 | Converse | |
| 5,096,223 A | 3/1992 | Tekelly et al. | |
| 5,116,092 A | 5/1992 | Schönleber | |
| 5,224,574 A | * 7/1993 | Thum ......................... | 296/189 |
| 5,293,973 A | * 3/1994 | Thum ......................... | 293/133 |
| 5,314,229 A | * 5/1994 | Matuzawa et al. ........... | 296/189 |
| 5,403,049 A | 4/1995 | Ebbinghaus | |
| 5,419,416 A | 5/1995 | Miyashita et al. | |
| 5,427,214 A | 6/1995 | Prottengeier et al. | |
| 5,431,445 A | 7/1995 | Wheatley | |
| 5,542,365 A | 8/1996 | Jurisich et al. | |
| 5,566,777 A | 10/1996 | Trommer et al. | |
| 5,597,055 A | 1/1997 | Han et al. | |
| 5,609,063 A | 3/1997 | Hedderly et al. | |
| 5,669,633 A | * 9/1997 | Naff et al. ................... | 188/376 |
| 5,732,801 A | 3/1998 | Gertz | |
| 5,820,163 A | 10/1998 | Thacker et al. | |
| 5,876,078 A | 3/1999 | Miskech et al. | |
| 6,062,355 A | * 5/2000 | Nohr et al. .................. | 188/377 |
| 6,068,329 A | 5/2000 | Miller | |
| 6,106,039 A | 8/2000 | Maki | |
| 6,174,009 B1 | * 1/2001 | McKeon ...................... | 293/133 |
| 6,231,095 B1 | * 5/2001 | Chou et al. .................. | 293/133 |

FOREIGN PATENT DOCUMENTS

DE           4316164        * 11/1994

* cited by examiner

*Primary Examiner*—Ken Patel
(74) *Attorney, Agent, or Firm*—Price, Heneveld, Cooper, DeWitt & Litton

(57) ABSTRACT

An energy absorbing impact system is designed for vehicle bumpers and the like, and includes a base member connected with a vehicle frame, and having a central opening therein. An impact receiving member is spaced apart from the base member, and is connected with a vehicle bumper. An invertible, tubular energy absorbing crush member is positioned between the base and impact receiving member, and includes a generally square lateral cross-sectional shape, with flat face portions disposed between opposite corner portions. One end of the crush member is connected with the impact receiving member, and the opposite end of the crush member is partially slit longitudinally to define planar tabs which are flared outwardly and connected with the base member adjacent the central opening, such that impact on the impact receiving member forces the crush member through the central opening in the base member, causing the face portions to tear longitudinally away from the corner portions as the crush member inverts through the central opening to absorb energy associated with the impact.

41 Claims, 5 Drawing Sheets

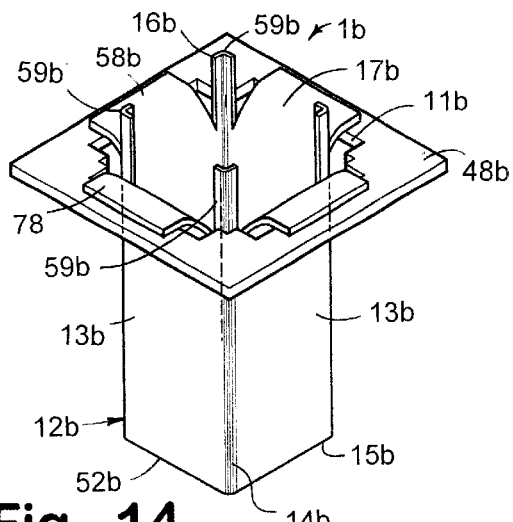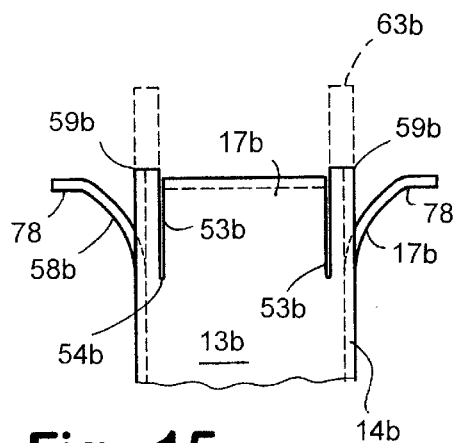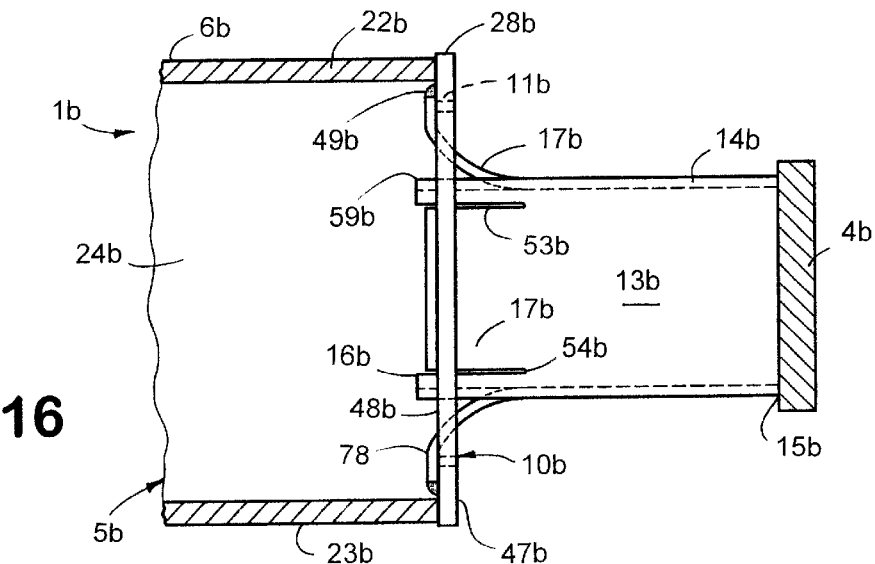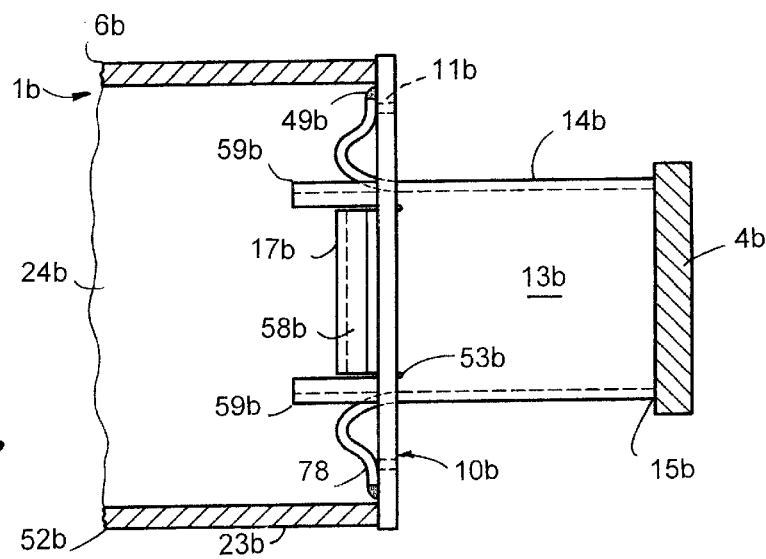

ENERGY ABSORPTION IMPACT SYSTEM AND METHOD FOR MAKING THE SAME

BACKGROUND OF THE INVENTION

The present invention relates to impact absorbing devices, and in particular to an energy absorbing impact system and related method for vehicle bumpers and the like.

Typical automotive bumper systems include three key components. The first component is a decorative fascia, usually constructed of plastic or the like. The second component is a rigid impact beam, typically constructed of roll formed or stamped steel, which supports the decorative fascia. The third element is an energy absorption unit or assembly that operably connects the impact beam to the frame rails of an associated vehicle. These three components are designed together to meet the performance requirements for both low and high speed impacts.

It is beneficial to design the bumper system in such a way that limited damage is transferred to the vehicle frame rails under impact. One guideline provided for this design process is for the bumper system to have a peak loading capability equivalent to around 85 percent of the combined rail capacity. This assures that the energy absorption unit will crush first upon impact before loading is imparted to the frame rails. It is also beneficial that the bumper system be designed so that energy can be absorbed in a controlled and repeatable manner. This allows for consistency in vehicle crash behavior.

Examples of energy absorption units in bumper systems can be found in U.S. Pat. Nos. 5,427,214; 5,723,801; and 4,272,114, which disclosure various methods of meeting the energy absorption targets for certain vehicle bumper systems. However, such prior devices include certain shortcomings, including inconsistency in deformation and resultant energy absorption, instability in lateral loading, high manufacturing costs, and post impact damage visibility.

While some energy absorption bumper systems incorporate an invertible crush member, the same have a cylindrical shape with scored sidewalls to control inversion and associated energy absorption. These designs sometimes experience problems in achieving consistent tear patterns and repeatable energy absorption characteristics.

SUMMARY OF THE INVENTION

One aspect of the present invention is an energy absorption impact system for vehicle bumpers and the like, comprising a base member adapted to be mounted to a vehicle frame, and including a central opening therethrough. An impact receiving member is positioned a spaced apart distance from the base member, and is configured to be operably connected with an associated vehicle bumper. The energy absorption impact system also includes an invertible, tubular energy absorbing crush member having a generally square lateral cross-sectional shape, with generally flat face portions thereof disposed between opposite corner portions thereof. The crush member has a first end thereof connected with the impact receiving member, and a second end thereof with face portions partially slit longitudinally to define generally planar tabs which are flared outwardly and connected with the base member adjacent the central opening, whereby impact on the impact receiving member forces the crush member through the central opening in the base member, causing the face portions to tear longitudinally away from the corner portions as the crush member inverts through the central opening to absorb energy associated with the impact.

Another aspect of the present invention is a method for making an energy absorption impact system for vehicle bumpers and the like, comprising the steps of forming a rigid base member with a central opening extending therethrough, and mounting the base member on an associated vehicle frame. The method also includes forming an impact receiving member, and positioning the same a spaced apart distance from the base member, and mounting the impact receiving member on an associated vehicle bumper. An invertible energy absorbing crush member is formed from a section of tubing having a generally square lateral cross-sectional shape, with generally flat portions thereof disposed between opposite corner portions thereof. One end of the crush member is connected with the impact receiving member, and the opposite end of the crush member is partially slit in a longitudinal direction to define generally planar tabs that are flared outwardly and connected to the base member adjacent the central opening, whereby impact on the impact receiving member forces the crush member through the central opening in the base, causing the face portions to tear longitudinally away from the corner portions as the crush member inverts through the central opening to absorb energy associated with the impact.

The principal objects of the present invention are to provide an energy absorption impact system that is particularly adapted for use with vehicle bumpers and the like. The energy absorption impact system achieves controlled, repeatable and consistent energy absorption performance, yet is economical to manufacture and can be easily installed and/or replaced. An energy absorbing crush member tube has faces that are split along the opposite corners to form spikes which initiate stable tearing conditions and assure the designed energy absorption characteristics. The energy absorption impact system is capable of a long operating life, and is particularly well adapted for the proposed use.

These and other advantages of the invention will further understood and appreciated by those skilled in the art by the reference to the following written specification, claims, and appended drawings.

BRIEF DESCRIPTION OF THE DRAWINGS

FIG. 14 is a perspective view of yet another embodiment of the present invention.

FIG. 15 is a side elevational view of a crush member portion of the assembly, shown in FIG. 14.

FIG. 16 is a side elevational view of the energy absorption impact assembly of FIG. 14, shown before impact.

FIG. 17 is a side elevational view of the energy absorption impact assembly of FIG. 14, shown after impact.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as installed in the front bumper of an associated vehicle. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
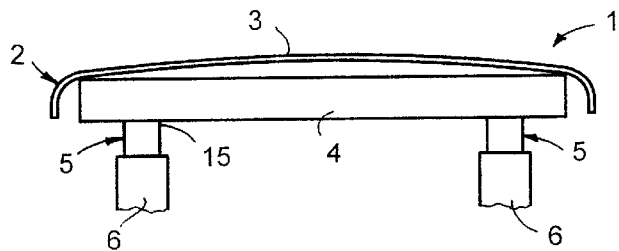
FIG. 1 is a partially schematic plan view of an energy absorption impact system embodying the present invention.

The reference numeral 1 (FIG. 1) generally designates an energy absorption impact system or unit embodying the present invention, which is particularly adapted for use in conjunction with the illustrated vehicle bumper assembly 2 of the type having a fascia member 3 supported by a rigid impact or reinforcement beam 4. A pair of impact absorbing assemblies 5 are positioned between and attach beam 4 to a pair of associated vehicle frame rails 6.

With reference to FIGS. 1–6, in the illustrated embodiment of the present invention, the two impact absorbing assemblies 5 are substantially identical in construction, and each includes a base member 10 connected with an associated vehicle frame rail 6, and having a central opening 11 therethrough. An impact receiving member, which in the illustrated example is defined by beam 4, is spaced apart from base member 10, and as noted above, is connected with fascia member 3. Each impact absorbing assembly 5 also includes an invertible, tubular energy absorbing crush member 12 that is positioned between base member 10 and beam 4, and has a generally square lateral cross-sectional shape, with generally flat face portions 13 disposed between opposite corner portions 14. The exterior end 15 of crush member 12 is connected with beam 4, and the interior end 16 is partially slit longitudinally to define planar tabs 17 which are flared outwardly and connected with base member 10 adjacent central opening 11, such that impact on fascia member 3 and/or beam 4 forces crush members 12 through the central openings 1 1 in base members 10, causing the face portions 13 to tear longitudinally away from their adjacent corner portions 14 as crush members 12 invert through the central openings 11 to absorb energy associated with the impact.

Figure 7:
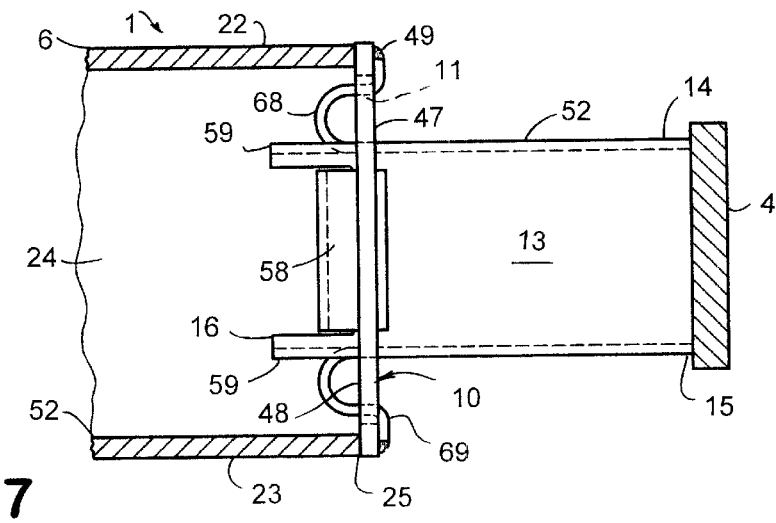
FIG. 7 is a side elevational view of a crush member assembly installed in a vehicle frame, shown before impact.
Figure 8:
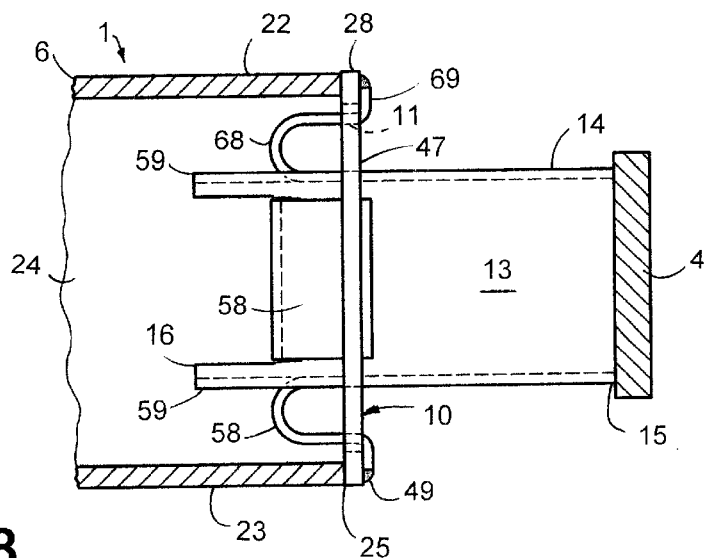
FIG. 8 is a side elevational view of the crush member assembly of FIG. 7, shown after impact.

As best shown in FIGS. 7 and 8, the illustrated frame rails 6 each have a hollow construction, and are in the form of a square beam, having an upper face 22, a lower face 23, and opposite side faces 24. Frame rails 6 are designed to support the vehicle thereon, and include a forward most end 25 to which an associated base member 10 is attached, as described in greater detail hereinafter. Typically, frame rails 6 are constructed from a formed rigid steel or the like.

Figure 2:
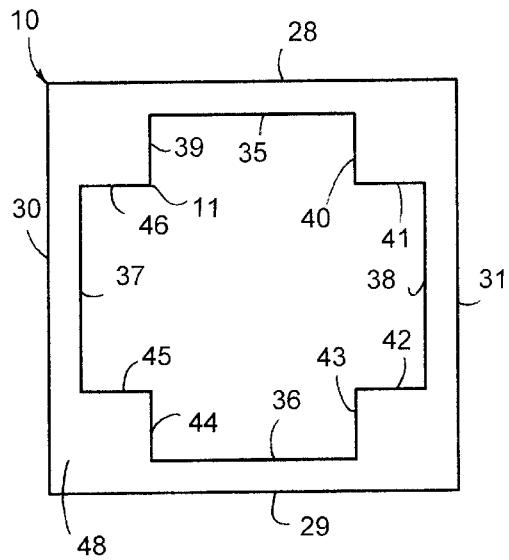
FIG. 2 is a plan view of a base member portion of the energy absorption impact system.
Figure 3:
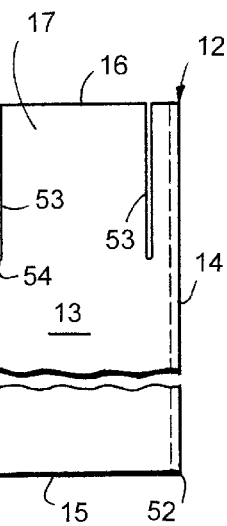
FIG. 3 is a side elevational view of the base member.

With reference to FIGS. 2 and 3, the illustrated base member 10 is in the form of a flat plate having a substantially square front elevational configuration defined by top and bottom edges 28 and 29, and opposite side edges 30 and 31. Base member 10 has a substantially uniform thickness, and is preferably constructed from steel or other similar materials.

The illustrated central opening 11 in base member 10 has an X-shaped or cruciform front elevational shape (FIG. 2), defined by top and bottom edges 35 and 36, opposite side edges 37 and 38, and corner edges 39–46. Central opening 11 extends all the way between the interior and exterior faces 47 and 48 respectively of base member 10. As shown in FIGS. 7 and 8, base member 10 is shaped to overlie the generally square forward end 25 of an associated frame rail 6, and is rigidly attached thereto by a perimeter weld bead 49 or the like.

Figure 4:
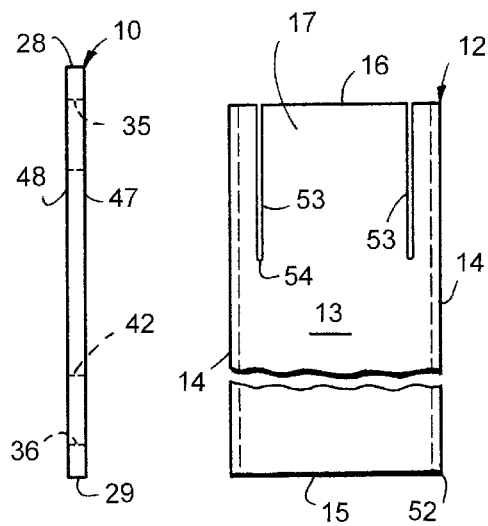
FIG. 4 is a side elevational view of a crush member portion of the energy absorption impact system, shown in a partially formed condition.
Figure 5:
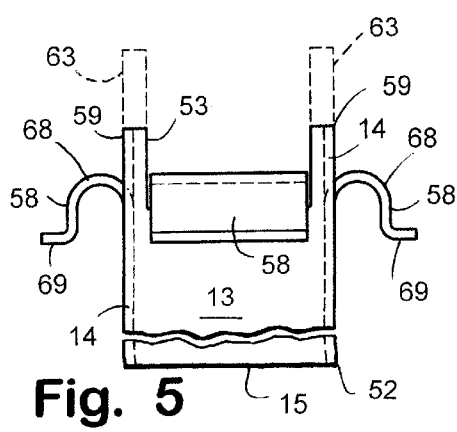
FIG. 5 is a side elevational view of the crush member shown in a filly formed condition.
Figure 6:
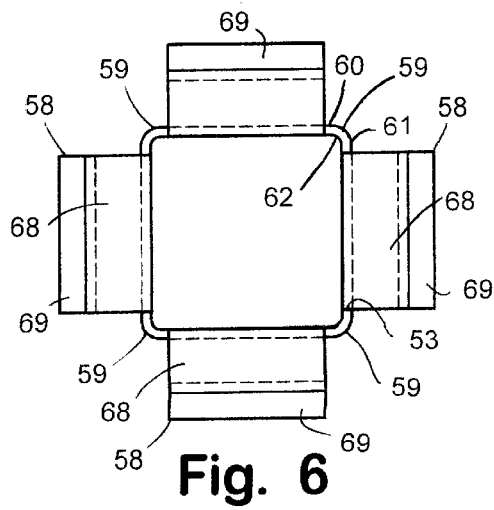
FIG. 6 is a top plan view of the crush member shown in FIG. 5.

With reference to FIGS. 4–6, the illustrated crush member 12 is constructed from a rigid tube 52 having a generally square lateral cross-sectional shape. In one working embodiment of the present invention, crush tube 52 has a sidewall thickness in the range of about 1 millimeter to about 5 millimeters, and is constructed from a steel having a strength of about 80 ksi. With reference to FIG. 4, each of the flat face portions 13 of crush tube 52 is severed or slit along two longitudinal lines 53 which begin at the interior end 16 of crush tube 52 and terminate at predetermined point 54, which is spaced apart from the exterior end 15 of crush tube 52. Each pair of slits 53 is parallel, and is spaced slightly inwardly from the opposite corner portions 14 of the associated tube face 13. Slits 53 may be formed using any suitable severing means, including conventional cutting, slitting, etc. The length of slits 53 is determined in accordance with the size and shape of tabs 17, as described in greater detail hereinafter. In the example illustrated in FIGS. 4–6, the slits 53 in each of the face portions 13 of crush tube 52 are disposed in a substantially identical location to define similarly shaped flat tabs 17 which extend between the opposite slits 53 and the adjacent interior end 16 of crush tube 52.

As best illustrated in FIGS. 5 and 6, tabs 17, when flared outwardly, define flanges 58 which serve to attach crush tube 52 to an associated base member 10. By flaring tabs 17 outwardly, the corner portions 14 of crush tube 52 become fully exposed to define tear-inducing spikes 59 at the interior end 16 of crush tube 52. In the illustrated embodiments of the present invention, crush tube 52 includes a spike 59 at the interior end of each corner portion 14, and as best illustrated in FIG. 6, each of the spikes 59 has a generally L-shaped top plan configuration, with mutually perpendicular legs 60 and 61 and an arcuately-shaped corner radius area 62. Each of the spikes 59 is generally straight and rigid, and extends in a direction generally parallel with the flat face portions 13 of crush tube 52. As explained in greater detail hereinafter, spikes 59 induce proper tearing of the face portions 13 of crush tube 52 away from their associated corner portions 14 to achieve reliable and controlled impact absorption. In contrast to some prior art devices, the face portions 13 of crush tube 52 do not have to be scored to achieve proper tearing characteristics, since spikes 59 initiate stable tearing conditions at each corner of crush tube 52. In the example illustrated in FIG. 5, the outermost end portions 63 of corner portions 14 are trimmed to form spikes 59, which facilitate insertion into an associated vehicle frame rail 6.

Figure 9:
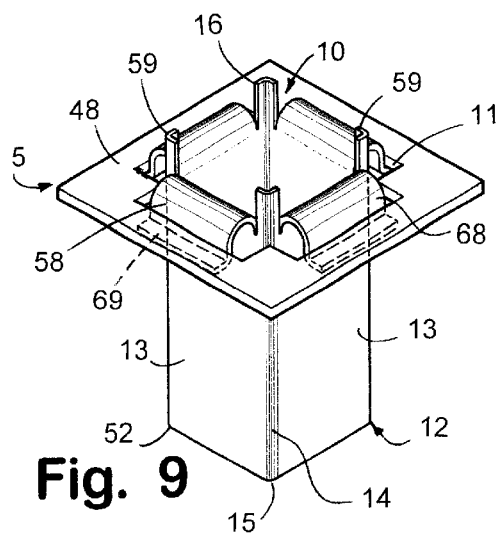
FIG. 9 is a rear perspective view of the crush member assembly, shown before impact.
Figure 10:
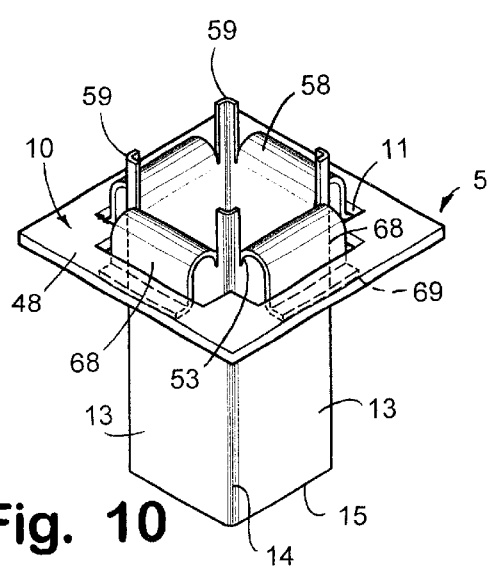
FIG. 10 is a rear perspective view of the crush member assembly, shown after impact.

In the example illustrated in FIGS. 5–8, each of the four flanges 58 has a generally U-shaped medial portion 68 and a generally flat end flange portion 69. Crush tube 52 is sized to be closely received within the central opening 11 of base member 10, with the corner portions 14 of crush tube 52 positioned adjacent the base member corners defined by the intersection of edges 39–46, as best shown in FIGS. 9 and 10.

In the example illustrated in FIGS. 7–10, the end flanges 69 of crush tube 52 are fixedly attached to the exterior face 47 of base member 10 by means such as the illustrated weld 49. Hence, the U-shaped medial portions 68 of tube flanges 58, as well as spikes 59, are disposed within the interior of the associated frame rail 6, and extend rearwardly, as shown in FIGS. 7 and 8. Crush tube 52 is thereby positioned generally in the center of frame rail 6 in an axially aligned relationship, wherein the face portions 13 of crush tube 52 are parallel with the faces 22–24 of the associated frame rail 6.

In operation, two impact absorbing assemblies 5 are attached to adjacent frame rails 6 in the manner describe hereinabove, such that the interior end 16 of each crush tube 52 is disposed within the interior of an associated frame rail 6, and the exterior end 15 of each crush tube 52 is disposed a spaced apart distance from the exterior surface 47 of base member 10. Beam 4 is rigidly attached to the exterior ends 15 of both crush tubes 52, which in turn support associated fascia member 3 in the manner illustrated schematically in FIG. 1. When the fascia member 3 is impacted, such as through contact with a fixed object or another moving vehicle, the force of the impact compresses crush tubes 52, and drives the exterior ends 15 of both crush tubes 52 rearwardly into the frame rails 6, thereby causing the face portions 13 of both of the crush tubes 52 to tear longitudinally away from their associated corner portions 14 as the crush member 12 deflects or inverts through the central opening 11 in base member 10, thereby absorbing the energy associated with the impact. As crush tubes 52 are pushed through the central openings 11 in base members 10, their interior ends 16 are essentially turned inside out, as shown in FIGS. 8 and 10. The longitudinal orientation of slits 53, in combination with tear-inducing spikes 59, causes tabs 17 to tear in a uniform longitudinal manner, and serves to prevent the tearing from extending or propagating in a lateral direction which would cause the tabs 17 to break away or separate from the associated crush tube 52. Hence, as best illustrated in FIG. 10, as the tabs 17 tear away from spikes 59, the spikes become longer, as do the flanges 58.

Figure 11:
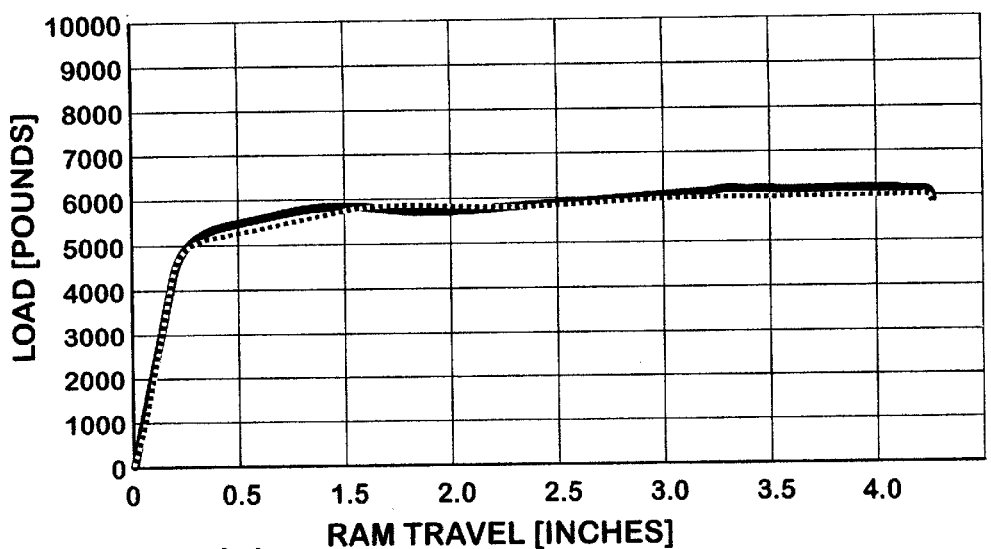
FIG. 11 is a diagram showing impact absorption results of one working embodiment of the energy absorption impact system.

The desired load curve for a vehicle energy absorption impact system is in the form of a substantially square wave load curve, wherein the load verses deflection characteristics are represented by a square wave. In other words, the load response has a rapid ramp up to a predetermined load, followed by a generally constant load value for the duration of the deflection. FIG. 11 illustrates test results from impact applied to one working embodiment of the present invention as disclosed herein. As shown in FIG. 11, after the initial ramp up impact load, the resistance load of the crush members to the impact force is generally level, i.e., a substantially square wave function. The impact curve can be controlled by the material of the crush members 12, the hardness of the material, the size and wall thickness of the crush tubes 52, and other similar factors to adapt energy absorption impact system 1 for a wide variety of different applications.

Figure 12:
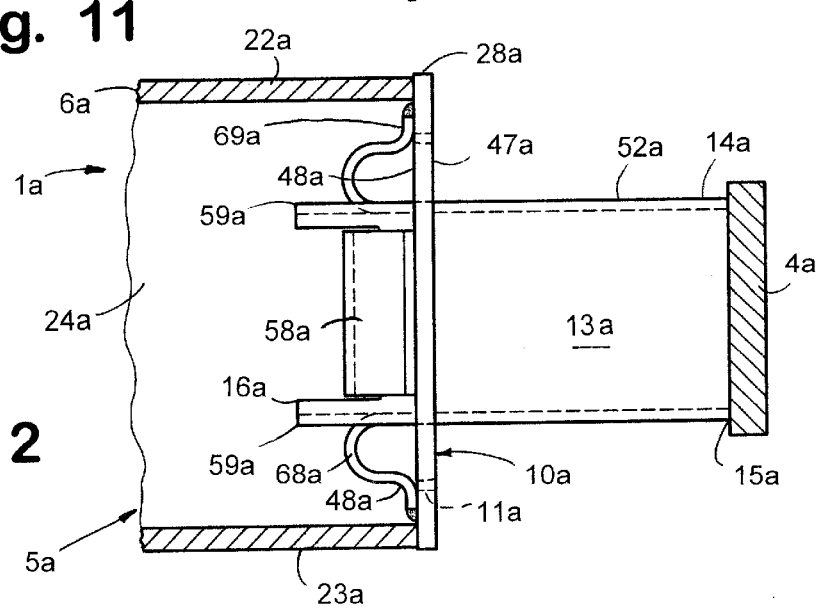
FIG. 12 is a side elevational view of another embodiment of the present invention installed in a vehicle frame, shown before impact.
Figure 13:
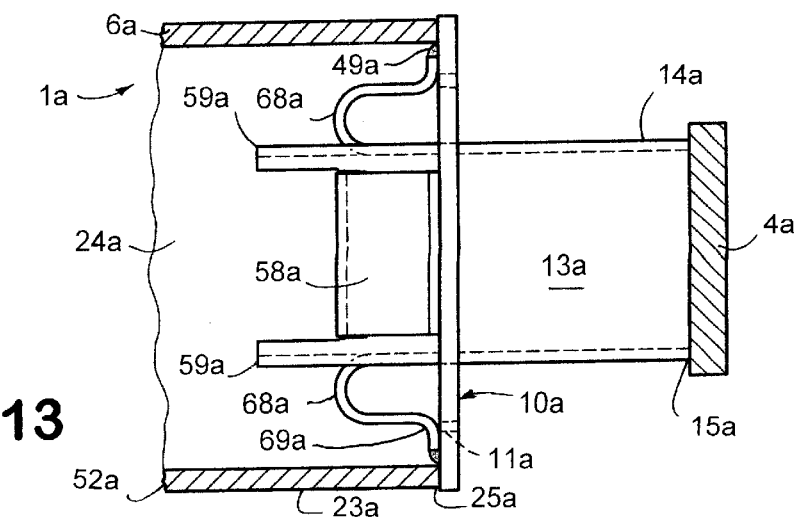
FIG. 13 is a side elevational view of the energy absorption impact system of FIG. 12, shown after impact.

The reference numeral 1a (FIGS. 12–13) generally designates another embodiment of the present invention which is identical to the previously described energy absorption impact system 1, except that the end flanges 69a of crush tubes 52a are attached to the interior face 48a of base member 10a, instead of the exterior face 47a as in the embodiment illustrated in FIGS. 7–10. Since impact system 1a is similar to the previously described impact system 1, similar parts appearing in FIGS. 7–10 and FIGS. 12–13 respectively are represented by the same, corresponding reference numerals, except for the suffix "a" in the numerals of the latter. In the illustrated impact system 1a, each of the crush tubes 52a has flanges 58a with U-shaped medial portions 68a and flat end flange portions 69a which are identical in shape to those of impact system 1. As shown in FIG. 13, during impact, each crush tube 52a inverts through the central opening 11a of base member 10a during the controlled tearing of the face portions 13a of crush tubes 52a away from their associated corner portions 14a, as described hereinabove.

The reference numeral 1b (FIGS. 14–17) generally designates yet another embodiment of the present invention which is identical to the previously described energy absorption impact system 1, except that the flanges 58b of tubes 52b are flared outwardly along a simple curve, and are not U-shaped like the embodiments 1 and 1a described hereinabove. Since impact system 1b is similar to the previously described impact systems 1 and 1a, similar parts appearing in FIGS. 7–8 and FIGS. 14–17 respectively are represented by the same, corresponding reference numerals, except for the suffix "b" in the numerals of the latter. In the energy absorption system 1b shown in FIGS. 14–17, the flanges 58b of each crush tube 52b curve gently outwardly, and include end portions 78 which are rigidly attached to the interior face 48b of base member 10b by means such as welding or the like. In the illustrated example, flanges 58b are in the form of a continuous curve. In operation, each of the tubes 52b inverts through the central opening 11b of the associated base member 10b in a manner similar to that described hereinabove. As shown in FIG. 17, the medial portions of flanges 58b bow inwardly as the same tear away from associated corner portions 14b. The curved shape of flanges 58b serves to promote clean tear induction and controlled tearing of the face portions 13b of crush tubes 52b away from their associated corner portions 14b.

Figure 18:
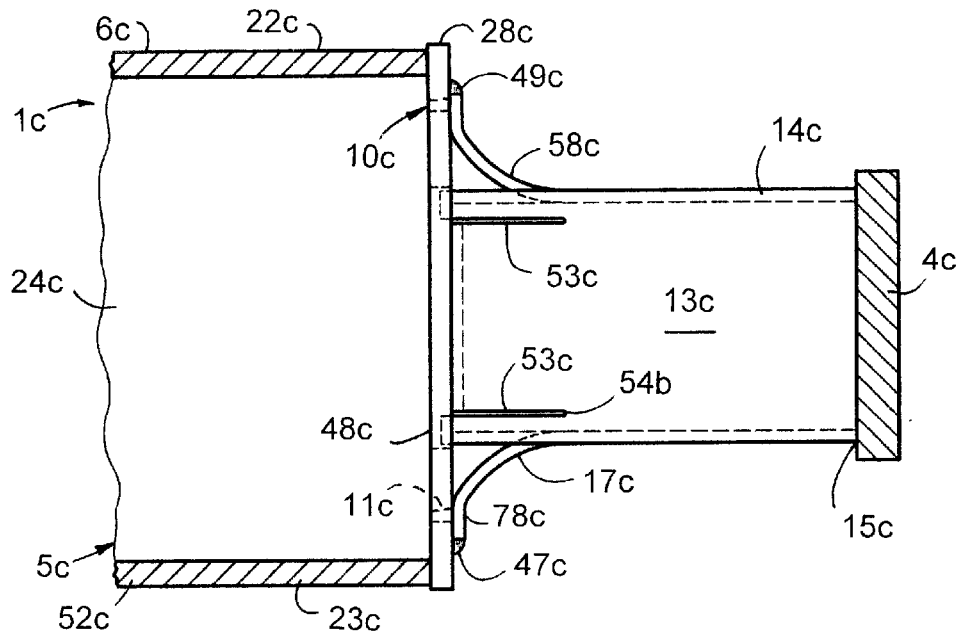
FIG. 18 is a side elevational view of yet another embodiment of the present invention, shown before impact.
Figure 19:
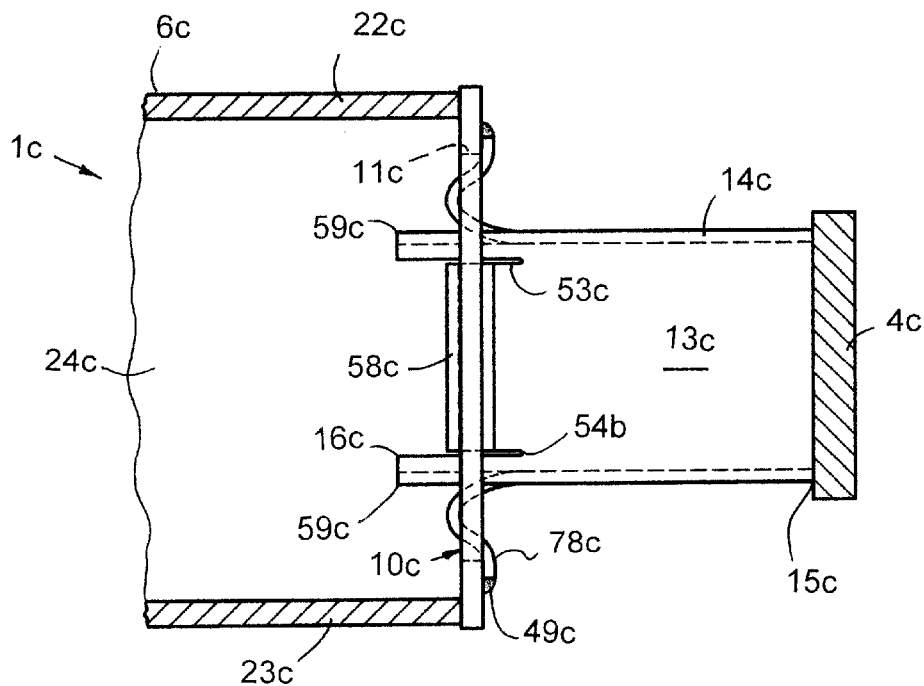
FIG. 19 is a side elevational view of the energy absorption impact assembly of FIG. 18, shown after impact.

The reference numeral 1c (FIGS. 18–19) generally designates yet another embodiment of the present invention, which is identical to the impact system 1b described hereinabove, except that the end portions 78c of flanges 58c are attached to the exterior face 47c of base member 10c, instead of the interior face 48c thereof. Since energy impact system 1c is similar to the previously described embodiment 1b, similar parts appearing in FIGS. 18 and 19 and FIGS. 16 and 17 respectively are represented by the same, corresponding reference numerals, except that the suffix in the reference numerals is "c" instead of "b".

In each of the embodiments described hereinabove, the energy absorption impact system 1 is particularly adapted for use with a vehicle bumper or the like, and achieves controlled and consistent energy absorption performance, yet is economical to manufacture, and can be easily installed and/or replaced. The longitudinally extending slits 53 in the face portions 13 of the tubes 52, in conjunction with the tear-inducing spikes 59 formed thereby, initiate stable tearing conditions and assure the designed energy absorption characteristics desired. The crush tubes 52 do not require sidewall scoring, yet have superior control of the tearing action to assure stable energy absorption. These improved tearing characteristics are provided even when higher strength materials are used.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. An energy absorption impact system for vehicle bumpers comprising:

a base member adapted to be mounted to a vehicle frame, and including a central opening extending therethrough;

an impact receiving member positioned a spaced apart distance from said base member, and configured to be operably connected with an associated vehicle bumper; and an invertible, tubular energy absorbing crush member having a generally square lateral cross-sectional shape, with generally flat face portions thereof disposed between opposite corner portions thereof; said crush member having a first end thereof connected with said impact receiving member, and a second end thereof with said face portions partially slit longitudinally to define generally planar tabs which are flared outwardly and connected with said base member adjacent said central opening, whereby impact on said impact receiving member forces said crush member through said central opening in said base member, causing said face portions to tear longitudinally away from said corner portions as said crush member inverts through said central opening to absorb energy associated with the impact.

2. An energy absorption impact system as set forth in claim 1, wherein:

said corner portions of said crush member define tear-inducing spikes.

3. An energy absorption impact system as set forth in claim 2, wherein:

said spikes each have a generally L-shaped top plan configuration, with an arcuately-shaped corner radius area.

4. An energy absorption impact system as set forth in claim 3, wherein:

said spikes are generally straight and extend in a direction generally parallel with the flat face portions of said crush member.

5. An energy absorption impact system as set forth in claim 4, wherein:

said partially slit face portions at the second end of said crush member are cut along generally parallel, longitudinally extending lines, such that said face portions tear away from said spikes along opposite sides thereof without separating from said crush member.

6. An energy absorption impact system as set forth in claim 5, wherein:

said tabs include ends welded to said base member.

7. An energy absorption impact system as set forth in claim 6, wherein:

said tabs have generally arcuate areas disposed along said face portions to facilitate initiating tearing of said face portions away from said spikes during impact.

8. An energy absorption impact system as set forth in claim 7, wherein:

said base member includes an outer face oriented toward said impact receiving member and an inner face oriented toward said spikes; and said tabs are attached to said inner face of said base member.

9. An energy absorption impact system as set forth in claim 8, wherein:

said arcuate areas of said tabs have a generally U-shaped side elevational configuration to facilitate initiating tearing of said face portions away from said spikes during impact.

10. An energy absorption impact system as set forth in claim 9, wherein:

said tabs have a generally flat end flange area thereof connected with said base member.

11. An energy absorption impact system as set forth in claim 10, wherein:

said base member comprises a flat plate constructed from steel.

12. An energy absorption impact system as set forth in claim 11, wherein:

said crush member is constructed from steel.

13. An energy absorption impact system as set forth in claim 12, wherein:

said crush member has a wall thickness in the range of about 1 millimeter to about 5 millimeters.

14. An energy absorption impact system as set forth in claim 13, wherein:

said steel for said crush member has a strength of about 80 ksi.

15. An energy absorption impact system as set forth in claim 7, wherein:

said base member includes an outer face oriented toward said impact receiving member and an inner face oriented toward said spikes; and said tabs are attached to said outer face of said base member.

16. An energy absorption impact system as set forth in claim 1, wherein:

said corner portions each have a generally L-shaped top plan configuration, with an arcuately-shaped corner radius area.

17. An energy absorption impact system as set forth in claim 1, wherein:

said corner portions are generally straight and extend in a direction generally parallel with the flat face portions of said crush member.

18. An energy absorption impact system as set forth in claim 1, wherein:

said partially slit face portions at the second end of said crush member are cut along generally parallel, longitudinally extending lines, such that said face portions tear away from said corner portions along opposite sides thereof without separating from said crush member.

19. An energy absorption impact system as set forth in claim 1, wherein:

said tabs include ends welded to said base member.

20. An energy absorption impact system as set forth in claim 1, wherein:

said tabs have generally arcuate areas disposed along said face portions to facilitate initiating tearing of said face portions away from said corner portions during impact.

21. An energy absorption impact system as set forth in claim 1, wherein:
said base member includes an outer face oriented toward said impact receiving member and an inner face oriented toward said spikes; and
said tabs are attached to said inner face of said base member.

22. An energy absorption impact system as set forth in claim 1, wherein:
said base member includes an outer face oriented toward said impact receiving member and an inner face oriented toward said spikes; and
said tabs are attached to said outer face of said base member.

23. An energy absorption impact system as set forth in claim 1, wherein:
said tabs have a generally U-shaped side elevational configuration to facilitate initiating tearing of said face portions away from said spikes during impact.

24. An energy absorption impact system as set forth in claim 1, wherein:
said tabs have a generally flat end flange area thereof connected with said base member.

25. An energy absorption impact system as set forth in claim 1, wherein:
said base member comprises a flat plate constructed from steel.

26. An energy absorption impact system as set forth in claim 1, wherein:
said crush member is constructed from steel, and
said tabs include flat end flange areas welded to said base member.

27. An energy absorption impact system as set forth in claim 1, wherein:
said central opening in said base member has a cruciform shape in which said crush member is closely received.

28. An energy absorption impact system as set forth in claim 1, wherein:
said crush member has a wall thickness in the range of about 1 millimeter to about 5 millimeters.

29. An energy absorption impact system as set forth in claim 1, wherein:
said crush member is constructed from steel having a strength of about 80 ksi.

30. A method for making an energy absorption impact system for vehicle bumpers comprising:
forming a rigid base member with a central opening extending therealong;
mounting the base member on an associated vehicle frame;
forming an impact receiving member, and positioning the same a spaced apart distance from the base member;
mounting the impact receiving member on an associated vehicle bumper;
forming an invertible energy absorbing crush member from a section of tubing having a generally square lateral cross-sectional shape, with generally flat face portions thereof disposed between opposite corner portions thereof;
connecting one end of the crush member with the impact receiving member;
partially slitting the opposite end of the crush member in a longitudinal direction to define generally planar tabs;
flaring the tabs outwardly; and
connecting the outwardly flared tabs to the base member adjacent the central opening therein, whereby impact on the impact receiving member forces the crush member through the central opening in the base member, causing the face portions to tear longitudinally away from the corner portions as the crush member inverts through the central opening to absorb energy associated with the impact.

31. The method as set forth in claim 30, wherein:
said partially slitting step includes forming tear-inducing spikes at the corner portions of the crush member.

32. The method as set forth in claim 31, wherein:
said flaring step includes forming the tabs into an arcuate shape.

33. The method as set forth in claim 32, wherein:
said connecting step includes attaching the tabs to an inner face of the base member.

34. The method as set forth in claim 33, wherein:
said partially slitting step includes cutting each of the face portions of the crush member along generally parallel, longitudinally extending lines that extend along opposite sides of the face portions, such that the face portions tear away from the corner portions without separating from the crush member.

35. The method as set forth in claim 34, wherein:
said partially slitting step includes forming each of the spikes with a generally L-shaped top plan configuration, and an arcuately-shaped corner radius.

36. The method as set forth in claim 35, wherein:
said impact receiving member forming step includes selecting a square steel tube having a wall thickness in the range of about 1 millimeter to about 5 millimeters.

37. The method as set forth in claim 36, wherein:
said impact receiving member forming step includes selecting a steel having a strength of about 80 ksi.

38. The method as set forth in claims 37, wherein:
said base member forming step includes selecting a steel plate and forming the central opening therein.

39. The method as set forth in claim 38, wherein:
said flaring step includes bending the tabs into a generally U-shaped side elevational configuration.

40. The method as set forth in claim 39, wherein:
said connecting step includes welding the tabs to the base member.

41. The method as set forth in claim 40, wherein:
said base member forming step includes forming the central opening in a cruciform shape to closely receive the crush member therein.

* * * * *

UNITED STATES PATENT AND TRADEMARK OFFICE
CERTIFICATE OF CORRECTION

PATENT NO. : 6,409,239 B1
DATED : June 25, 2002
INVENTOR(S) : Todd W. J. Tjoelker et al.

It is certified that error appears in the above-identified patent and that said Letters Patent is hereby corrected as shown below:

Column 1,
Line 32, "disclosure" should be -- disclose --.
Lines 56 and 65, "comer" should be -- corner --.

Column 2,
Line 30, "comers" should be -- corners --.
Line 35, after "will" insert -- be --.
Line 50, "filly" should be -- fully --.

Column 3,
Line 61, "openings 1 1" should be -- openings 11 --.
Line 63, "comer" should be -- corner --.

Column 4,
Line 17, "comer" should be -- corner --.

Column 5,
Line 24, "describe" should be -- described --.

Column 6,
Line 32, "lb" should be -- 1b --.

Column 9,
Line 59, "comer" should be -- corner --.

Column 10,
Lines 17, 31, and 36, "comer" should be -- corner --.

UNITED STATES PATENT AND TRADEMARK OFFICE
CERTIFICATE OF CORRECTION

PATENT NO. : 6,409,239 B1
DATED : June 25, 2002
INVENTOR(S) : Todd W. J. Tjoelker et al.

It is certified that error appears in the above-identified patent and that said Letters Patent is hereby corrected as shown below:

<u>Column 10 con't,</u>
Line 45, "claims 37" should be -- claim 37 --.

Signed and Sealed this

Twenty-first Day of January, 2003

JAMES E. ROGAN
*Director of the United States Patent and Trademark Office*